United States Patent [19]

Taschuk

[11] 4,300,536
[45] Nov. 17, 1981

[54] AUXILIARY HOT WATER BOILER WITH SOLAR HEATER AND HEAT EXCHANGE SYSTEM

[75] Inventor: John N. Taschuk, North Kingstown, R.I.

[73] Assignee: James P. Flynn, R.I. ; a part interest

[21] Appl. No.: 113,293

[22] Filed: Jan. 18, 1980

[51] Int. Cl.³ .............................................. F24J 3/02
[52] U.S. Cl. .................................... 126/435; 126/428; 126/437; 126/400; 122/16; 237/8 R; 237/61
[58] Field of Search .............. 126/435, 437, 428, 432, 126/400, 364, 389, 344, 121; 237/8 R, 16, 18, 19, 61; 165/104 S, 157, 163, 485; 122/13–17, 37

[56] References Cited

U.S. PATENT DOCUMENTS

| | | | |
|---|---|---|---|
| 559,606 | 5/1896 | Rice | 122/15 |
| 897,609 | 9/1908 | Fairchild | 237/61 X |
| 1,871,108 | 8/1932 | Burnett | 126/364 |
| 2,704,188 | 3/1955 | Bergmann | 237/19 X |
| 3,380,895 | 4/1968 | Loebel | 122/17 X |
| 3,490,420 | 1/1970 | Kramer | 122/17 |
| 4,150,787 | 4/1979 | Braathen | 126/361 X |
| 4,157,706 | 6/1979 | Gaskill | 126/435 |
| 4,184,635 | 1/1980 | Bloomfield | 126/400 X |

FOREIGN PATENT DOCUMENTS 2601412 7/1977 Fed. Rep. of Germany ...... 126/435

*Primary Examiner*—Larry Jones
*Attorney, Agent, or Firm*—LeBlanc, Nolan, Shur & Nies

[57] ABSTRACT

An auxiliary hot water boiler and heat exchange system including a solar heater and adapted for use with a conventional, domestic closed loop hot water heating system and a conventional, domestic hot water heater. A first heat exchanger connected with a solar heat absorber provides a primary source of heat for a supply of water in the boiler. A second heat exchanger provides preheated water for a hot water heater. Water in the boiler is directly fed to a conventional closed loop hot water heating system to provide preheated water therefor. A pair of fireboxes with their flues are arranged one above the other in the boiler and have their flues joined and projected through the top of the boiler. An additional flue is located within the boiler and has an external inlet for connection to an additional boiler. A third heat exchanger provides preheated water to the additional boiler. The boiler may be fabricated as a prepackaged subassembly, ready for erection and interconnection to other components at the construction site.

7 Claims, 3 Drawing Figures

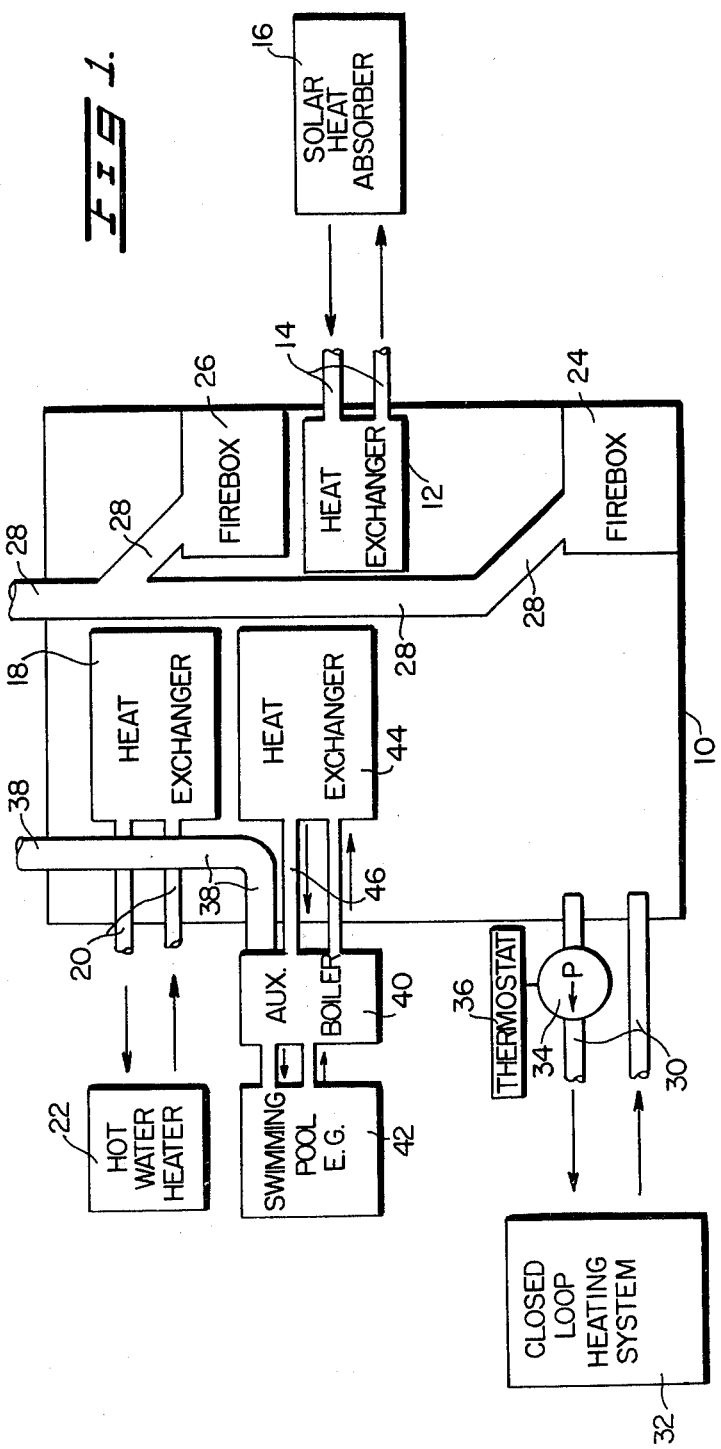

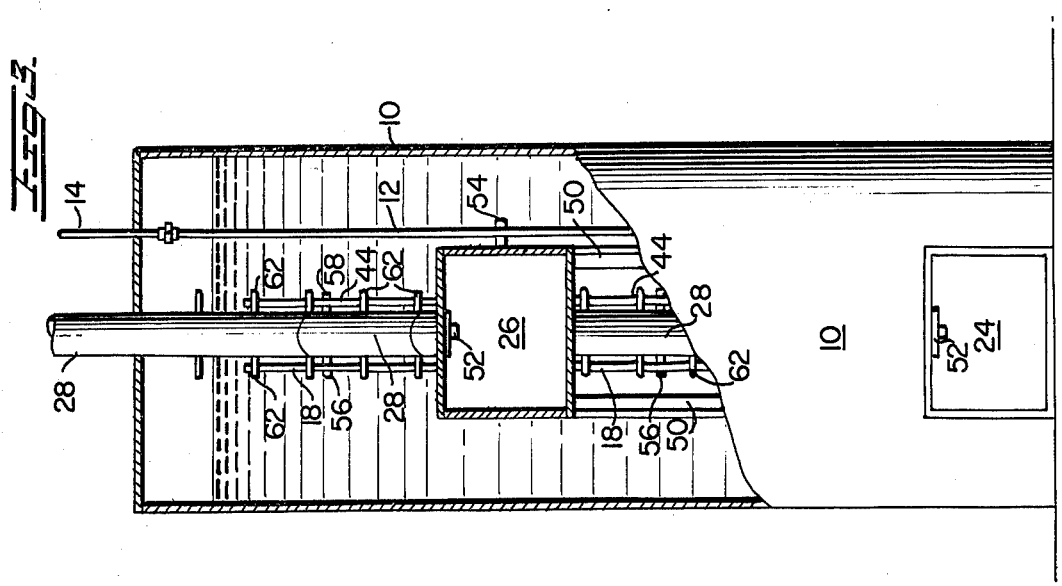
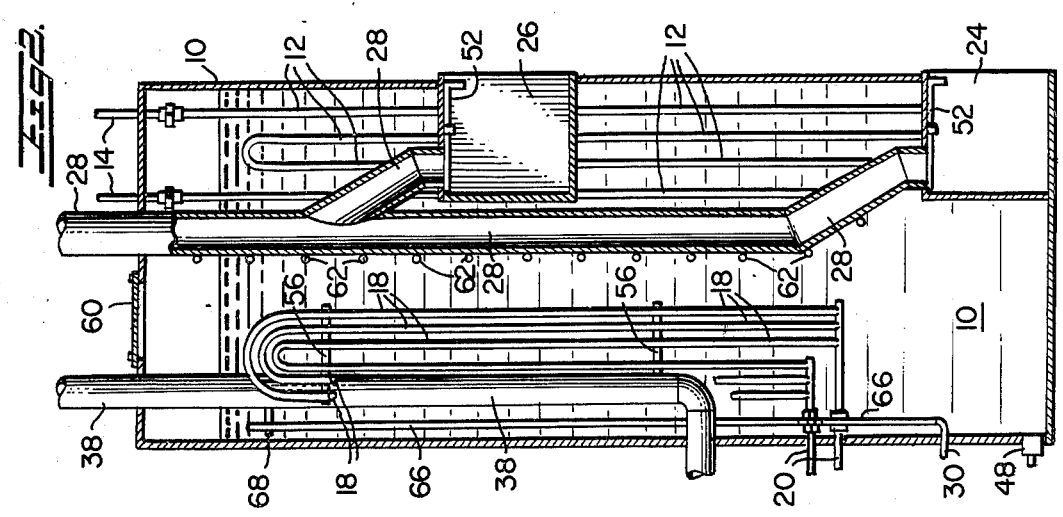

4,300,536

AUXILIARY HOT WATER BOILER WITH SOLAR HEATER AND HEAT EXCHANGE SYSTEM

BACKGROUND OF THE INVENTION

This invention relates to heating systems in general and more particularly to an improved auxiliary hot water boiler and heat exchange system adapted for interconnection with a solar heat absorber and the heating plant and hot water heater of a conventional home.

Generally speaking, such systems are disclosed in several prior art patents. U.S. Pat. No. 4,034,738 issued July 12, 1977 to E. M. Barber, Jr. discloses a solar heating system including a main water storage tank heated from a solar heat absorber through a closed circuit fluid system and a heat exchanger. An additional heat exchanger in the main tank supplies heated water to a conventional, domestic hot water heater. Yet another heat exchanger in the main tank provides a source of heat for a domestic heating system through a closed loop. Fluid is pumped through the loop and the pump is thermostat controlled. Alternatively, this last mentioned heat exchanger may be eliminated and hot water in the main tank may be pumped directly to the domestic heating system.

A disclosure of a hot water heater, wherein both firebox and the flue thereof are surrounded by water to be heated, appears in U.S. Pat. No. 2,704,188 issued Mar. 15, 1955 to R. L. Bergueau. An additional disclosure of using solar energy to heat the water of a conventional hot water heater appears in U.S. Pat. No. 4,126,122 issued Nov. 21, 1978 to T. D. Bross. U.S. Pat. No. 4,050,626, issued Sept. 27, 1977 to T. Y. Awalt Jr., shows a solar water heater with a direct combustion assist for heating the water.

A tank having dual water compartments and a heat exchanger to service a domestic hot water system, an auxiliary heater, a solar heat absorber and a heat exchanger providing hot water to a heating coil or heat pump is set forth in U.S. Pat. No. 4,119,086 issued Oct. 10, 1978 to N. E. Brussels. Other relevant disclosures of solar heating systems designed for domestic use appear in U.S. Pat. No.'s 2,689,090 issued Sept. 14, 1954 to G. D. Wetherbee et al and 4,143,642 issued Mar. 13, 1979 to A. A. Beanlieu.

While it is readily apparent in that major components of the instant invention are disclosed in one or more of the prior art patents above enumerated, the relatively compact subassembly system herein detailed and claimed is not disclosed by these patents nor is the overall system taught thereby. More specifically, the prior art does not anticipate an auxiliary hot water boiler and heat exchanger system including a main water tank having up to three heat exchangers therein, the first heat exchanger receiving heat from a solar heat exchanger, the second heat exchanger providing preheated water for a domestic hot water heater, and the third heat exchanger providing hot water for an additional use or uses (e.g., for heating swimming pool water), the third heat exchanger being supplemented by an additional boiler having a flue directed through the main tank to further heat water therein, water in the main tank being pumped to a domestic, closed loop hot water system; additionally, the main tank has one or more fireboxes directly incorporated therein, the flues thereof being surrounded by water in the main tank to further heat the main tank water supply.

SUMMARY OF THE INVENTION

Accordingly, it is a principal object of the invention to provide an auxiliary heating system for domestic use including water filled storage tank, a first heat exchanger in the tank receiving heat from a solar heat absorber, a second heat exchanger providing preheated water to a conventional hot water heater, an additional boiler adjacent the main tank having its flue directed through the tank to further heat water therein, one or more fireboxes incorporated directly in the tank with a flue surrounded by the water to thus provide a further source of heat for the main water supply, and a conduit assembly for conveying the heated water directly to a closed loop, domestic hot water heating system.

It is another object of the invention to provide an auxiliary heating system including a water filled main tank, a heat exchanger receiving heat from a solar heat absorber and two heat exchangers to provide hot water for a conventional domestic hot water heater, and an additional system requiring heated water such as a swimming pool, the water in the main tank being pumped directly to an otherwise conventional, domestic closed loop, hot water heating system.

It is a further object of the invention to provide as the principal component of an anxiliary heating system, a prepackaged subassembly including a main, generally cylindrical and vertically oriented storage tank for holding a supply of water, one or more fireboxes fabricated integrally within the tank and having a flue directly upwardly within the tank, through the top of the tank, a first heat exchanger adapted for connection to a solar heat absorber to receive heat therefrom, a second heat exchanger to provide hot water to a domestic hot water heater, fittings in the tank for connecting the tank directly to a domestic closed loop hot water heating system, and an additional flue within the tank having a sidewall connection through the tank which is attached to an additional boiler positioned adjacent the main tank.

In general, the invention disclosed and claimed herein is an auxiliary hot water boiler and heat exchange system intended essentially for domestic use and including an upright, cylindrical storage tank with a first heat exchanger for receiving heat from a solar heat absorber and a second heat exchanger for providing preheated water to a domestic hot water heater. One or more fireboxes are fabricated integrally within the tank and include a flue system, also within the tank. An additional or auxiliary boiler is located adjacent the main tank with its flue directed within the tank. A closed circuit system conveys water within the tank directly to a domestic closed loop hot water heating system. A third heat exchanger in the tank provides hot water for the additional auxiliary boiler, this hot water being used to provide heated water for an additional use, such as a swimming pool. The tank has a manhole opening at the top and a service ladder constructed as a part of the firebox flue system, so that the unit may be serviced periodically.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which:

FIG. 1 is a block diagram of the components of the invention.

FIG. 2 is an elevation section view of the auxiliary hot water tank and heat exchange system subassembly; and FIG. 3 is a view similar to FIG. 2 but only partly in section and drawn in a plane opposed 90° to the section plane of FIG. 2.

DESCRIPTION OF THE PREFERRED EMBODIMENTS

Referring now to the drawings by reference character and particularly to FIG. 1 thereof, the principal components of the overall heating system are illustrated, including a main storage tank 10 having a supply of water therein, a first heat exchanger 12, mounted within tank 10 and having a first closed circuit conduit system 14 interconnected with a solar heat absorber 16, a second heat exchanger 18 which provides preheated water through a second closed circuit conduit system 20 for an otherwise conventional, domestic hot water heater 22, and an additional heat source including a pair of fireboxes 24, 26 arranged one over the other within tank 10 and having a flue system 28, also within tank 10, to further heat the water therewithin. A third closed circuit conduit system 30 directly conveys heated water within tank 10 to an otherwise conventional, domestic, closed loop, hot water heating system 32. System 32 may be in the form of a baseboard radiation system, a forced air system with a hot water coil or a radiator and boiler system. A pump 34 has a thermostat control 36 so that, when demand for heat is sensed by thermostat 36, pump 34 is actuated to circulate heat to the normal, domestic heating system 32.

Tank 10 also includes a flue and vertical stack assembly 38 which is connected to an additional or auxiliary boiler 40, which provides heated water for an additional use, e.g., a swimming pool 42. Preheated water for boiler 40 is provided by a third heat exchanger 44 arranged within tank 10 and includes a fourth, closed circuit conduit system 46 to convey the water from tank 10 to and from additional boiler 40.

The prepackaged subassembly of the invention is illustrated in FIGS. 2 and 3. In a preferred embodiment, tank 10 is in the form of a vertically upright, cylindrical cylinder, fabricated from ¼ inch plate steel and is about 6 feet in diameter and 16 feet long. Total fluid capacity is about 4,000 gallons. A convenient drain 48 is provided at the base of tank 10.

Fireboxes 24 and 26 are fabricated integrally within tank 10, firebox 26 being supported above firebox 24 by a series of angle iron struts 50 (FIG. 3). Each firebox 24, 26 includes a manual or automatically controlled damper at 52. Flue system 28 for fireboxes 24, 26 is enclosed entirely within tank 10 so that the maximum amount of exhaust heat from the fireboxes may be utilized to provide an additional source of heat for the water in tank 10.

Heat exchanger 12 is made of approximately 80 feet of ¾ inch type M copper tubing arranged in serpentine fashion and supported by one or more straps 54 (FIG. 3). Solar heat absorber 16 per se forms no part of the instant invention. Ordinarily, a glycol solution is circulated from absorber 16 to heat exchanger 12 by a pump with suitable controls (not shown), heat exchanger 12 then dispersing the heat collected by absorber 16.

Heat exchanger 18 is made from approximately 160 feet of 1 inch diameter type M copper tubing and is supported by straps 56. In a typical application, heat exchanger 18 will be employed to preheat hot water for the hot water heater 22 to within a few degrees F. of storage temperature. Thus, the regular hot water burner (not shown) is only needed to heat the water the remaining small increment to the desired operating temperature. For example, the normal hot water heater usually heats water from 60 degrees F. up to 150 degrees F. In the present invention, heat exchanger 18 provides water preheated to 140 degrees F. Accordingly, the normal hot water heater 22 is only used to raise the water temperature an additional 10 degrees F.

Heat exchanger 44 is made of 60 feet of type M copper tubing of desired diameter and is supported by straps 58 (FIG. 3). In conjunction with additional boiler 40, it is used on a seasonable basis to provide heated water for a swimming pool, for example. Heat exchanger 44 is used in the same manner as heat exchanger 18 in that it provides preheated water for boiler 40.

Access to the interior of tank 10 for periodic maintenance, repair or cleaning is provided by a manhole 60 through the top 62 of tank 10 and a service ladder in the form of paired rungs 62 arranged along the sides of flue system 28.

Closed circuit system 30 also includes inlet and outlet pipes 66 arranged alongside one another and straps supported at 68 within tank 10.

The arrangement of fireboxes 24 and 26 entirely within tank 10 maximizes the amount of heat that will be retained by the water within tank 10. Additionally, since the fireboxes are surrounded by water at a warmer temperature than ambient temperature, ordinarily, then draft control of the fireboxes is relatively easier. It is intended that most of the heat for water in tank 10 will be generated by solar heat absorber 16. However, this heat source has to be supplemented periodically, particularly at night and more often in northern climates.

As can be readily appreciated from an inspection of FIGS. 2 and 3, a prefabricated structure is provided which may be constructed in a factory with the attendant advantages of strict quality and uniformity controls. The entire unit may then be shipped to a home construction site and be connected relatively easily to the other, previously described components of the domestic heating system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use as the principal component of an auxiliary hot water boiler and heat exchange system, a prepackaged subassembly comprising: an upright, cylindrical tank having a top and a bottom; at least on firebox fabricated integrally within said tank; a first flue from said firebox, directed upwardly through said top of said tank; a first heat exchanger within said tank; first fittings on said first heat exchanger through said tank which are adapted to be interconnected with a solar heat absorber; a second heat exchanger; second fittings on said second heat exchanger through said tank which are adapted to be interconnected with a conventional, domestic hot water heater; a second flue comprising an inlet through a side wall of said tank and an interior, vertically oriented stack emerging through said tank top, the inlet of said second flue being adapted to be connected to the flue of an additional boiler, a third heat exchanger within said tank; and third fittings on said third exchanger, through said tank which are adapted to be interconnected with the additional boiler.

2. The prepackaged subassembly as claimed in claim 1, said tank further comprising a second firebox, arranged over said first firebox and a third flue from said second firebox connected to said first flue.

3. The prepackaged subassembly as claimed in claim 2, wherein said first flue has a series of service ladder rungs arranged thereon, there being a manhole access formed through said tank top, adjacent said first flue.

4. An auxiliary hot water boiler and heat exchange system for use with a conventional, domestic closed loop hot water heating system and a conventional, domestic hot water heater comprising: a storage tank having a supply of water therein; at least one firebox within said tank; a first flue from said firebox located within said tank and emerging through the top thereof, heat generated by said firebox and first flue providing a supplemental heat source for the water in said tank; a first heat exchanger with said tank; solar heat absorber means; first closed circuit conduit means interconnecting said solar heat absorber means and said first heat exchanger to thereby provide a primary source of heat for the water in said tank; a second heat exchanger; second, closed circuit conduit means interconnecting the hot water heater and said second heat exchanger to thereby provide preheated water for the water heater; an additional hot water boiler located adjacent said tank; a second flue from said additional boiler directed through a side wall of said tank and emerging through the top thereof to thereby provide an additional source of heat for the water in said tank; and third closed circuit conduit means directly interconnecting the water in said tank and the water of the conventional, closed loop hot water heating system.

5. The auxiliary hot water boiler and heat exchange system as claimed in claim 4, further comprising a third heat exchanger in said tank and fourth, closed circuit conduit means directly interconnecting said additional boiler and said third heat exchanger to thereby provide a supply of preheated water for said additional boiler.

6. The auxiliary hot water boiler and heat exchange system as claimed in claim 4 wherein said third closed circuit conduit means further comprise a pump interposed in said third conduit means and a thermostat control for said pump whereby, in response to demand for heat, said pump will be activated to circulate water from said tank through said pump, to and through the closed loop hot water heating system and back to said tank.

7. The auxiliary hot water boiler and heat exchange system as claimed in claim 4 further comprising a second firebox in said tank, arranged over said one firebox and a third flue from said second firebox, connected to said first flue.

* * * * *